United States Patent
Jiang (10) Patent No.: US 10,298,318 B1
(45) Date of Patent: May 21, 2019

(54) PILOT TONE COMPENSATION IN RECEIVER OPTICAL DIGITAL SIGNAL PROCESSING

(71) Applicant: Zhiping Jiang, Kanata (CA)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/843,897

(22) Filed: Dec. 15, 2017

(51) Int. Cl.
- *H04B 10/61* (2013.01)
- *H04B 10/077* (2013.01)
- *H04L 1/00* (2006.01)
- *H04J 14/02* (2006.01)

(52) U.S. Cl.
CPC ..... *H04B 10/0775* (2013.01); *H04B 10/0773* (2013.01); *H04J 14/0258* (2013.01); *H04L 1/0057* (2013.01)

(58) Field of Classification Search
CPC .......................... H04B 10/616; H04B 10/6161
See application file for complete search history.

(56) References Cited

U.S. PATENT DOCUMENTS

| 9,473,263 | B2 | 10/2016 | Jiang et al. | |
|---|---|---|---|---|
| 9,705,628 | B2 | 7/2017 | Jiang et al. | |
| 9,906,308 | B1* | 2/2018 | Pajovic | H04B 3/32 |
| 2015/0295648 | A1 | 10/2015 | Mutalik et al. | |
| 2016/0211938 | A1* | 7/2016 | Jiang | H04B 10/0775 |

FOREIGN PATENT DOCUMENTS

| CN | 102594447 A | 7/2012 |
|---|---|---|
| CN | 107210935 A | 9/2017 |

* cited by examiner

*Primary Examiner* — Shi K Li (57) ABSTRACT

The inclusion of a pilot tone as a modulation of an optical data signal reduces the optical signal to noise ratio (OSNR). Methods and apparatus for receiving an optical signal are provided that compensate for at least a portion of the pilot tone modulation to reduce the pilot tone induced OSNR penalty. An initial waveform is processed to generate a compensated waveform, the processing including dispersion compensation. An intensity waveform is calculated in accordance with the compensated waveform. The intensity waveform is processed to obtain a pilot tone frequency, a modulation depth, and a phase of the pilot tone. The compensated waveform is multiplied with a pilot tone compensation factor that is a function of the pilot tone frequency, the modulation depth, and the phase of the pilot tone to generate a modified compensated waveform. A symbol carried by the modified compensated waveform is determined.

24 Claims, 9 Drawing Sheets

PILOT TONE COMPENSATION IN RECEIVER OPTICAL DIGITAL SIGNAL PROCESSING

FIELD

The application relates generally to optical communication network devices and in particular embodiments to optical receivers and methods thereof.

BACKGROUND

Optical communication systems are widely used today for data communication. Such systems typically use optical fibers as the transmission medium to allow high data rates and long distance transmissions. These optical communication systems commonly utilize optical dense wavelength division multiplexing (DWDM) to exploit the available optical spectrum. In optical DWDM, data is modulated onto several different carrier waves of different wavelengths, with carriers at different wavelengths commonly referred to as channels or channel wavelengths.

In such optical communication systems, the use of pilot tones for identifying the wavelength of an optical data signal is known. The pilot tone will generally be a low frequency modulation (e.g., kHz to MHz) of an optical data signal for channel identification. Each channel wavelength may have a unique pilot tone frequency. Additionally, pilot tones can be modulated themselves, e.g., they can be turned on and off at a low rate, for example, 100 bits/s, to carry additional information, such as the modulation format of the optical data signal, the origin of the optical data signal, the optical spectrum width, baud rate, etc. Pilot tone detectors (PTDs), which may consist of a low speed photodiode and a digital signal processor (DSP), may be placed at many locations in an optical network to monitor channel information, such as wavelength or other information carried on pilot tones, providing a low cost, efficient solution for managing optical DWDM systems.

However, the inclusion of a pilot tone as a modulation of an optical data signal can reduce the optical signal to noise ratio (OSNR) of the optical data signal.

Improvements in optical receivers to compensate for the pilot tone induced OSNR penalty are therefore desirable.

SUMMARY

The inclusion of pilot tones has advantages from an optical performance monitoring perspective, but as noted above potentially has a negative impact on optical receiver performance due to the OSNR penalty induced by the pilot tone modulation.

Aspects of this disclosure provide mechanisms for pilot tone compensation in coherent optical receivers to at least partially mitigate the pilot tone induced OSNR penalty.

According to a first aspect, the present disclosure provides a method for receiving an optical signal that includes a pilot tone. The method may include processing an initial waveform to generate a compensated waveform. The processing may include at least dispersion compensation. The method may further include calculating an intensity waveform in accordance with the compensated waveform, processing the intensity waveform to obtain a pilot tone frequency of the pilot tone, a modulation depth of the pilot tone, and a phase of the pilot tone, and multiplying the compensated waveform with a pilot tone compensation factor to generate a modified compensated waveform. The pilot tone compensation factor may be a function of the pilot tone frequency, the modulation depth, and the phase of the pilot tone. The method may also include determining a symbol carried by the modified compensated waveform.

In some embodiments of the method according to the first aspect, the pilot tone compensation factor may be a function of the pilot tone frequency, the modulation depth, and the phase of the pilot tone such that substantially half of the pilot tone in the compensated waveform is cancelled in the modified compensated waveform. For example, the pilot tone compensation factor may be equal to:

$$1 - \frac{1}{2}m_d \times \sin(1 + 2\pi f_{PT} t + \emptyset),$$

where $m_d$ is the modulation depth of the pilot tone, $f_{PT}$ is the pilot tone frequency of the pilot tone, $\emptyset$ is the phase of the pilot tone, and t is time.

In some embodiments of the method according to the first aspect, calculating the intensity waveform and processing the intensity waveform to obtain the pilot tone frequency of the pilot tone, the modulation depth of the pilot tone, and the phase of the pilot tone occurs during a first time interval of a first length. In such embodiments, multiplying the compensated waveform with the pilot tone compensation factor to obtain the modified compensated waveform may include monitoring for detection of the pilot tone within a plurality of second time intervals of a second length, and selectively multiplying the compensated waveform with the pilot tone compensation factor in a given second time interval of the plurality of second time intervals, responsive to detecting the pilot tone within a preceding second time interval of the plurality of second time intervals, wherein the preceding second time interval immediately precedes the given second time interval. The second length may be shorter than the first length. For example, in some embodiments the second length may be shorter than a forward error correction (FEC) block duration, e.g., less than 20% of the FEC block duration.

For example, in some such embodiments, the pilot tone compensation factor is equal to: $1-m_d \times \sin(1+2\pi f_{PT} t+\emptyset)$, where $m_d$ is the modulation depth of the pilot tone, $f_{PT}$ is the pilot tone frequency of the pilot tone, $\emptyset$ is the phase of the pilot tone, and t is time.

In some embodiments, selectively multiplying the compensated waveform with the pilot tone compensation factor in the given second time interval responsive to detecting the pilot tone within the preceding second time interval includes: responsive to detecting the pilot tone within one of the second time intervals, multiplying the compensated waveform with the pilot tone compensation factor in a subsequent second time interval; and responsive to not detecting the pilot tone within one of the second time intervals, not multiplying the compensated waveform with the pilot tone compensation factor in a subsequent second time interval.

In some embodiments of the method according to the first aspect, calculating the intensity waveform and processing the intensity waveform to obtain the pilot tone frequency of the pilot tone, the modulation depth of the pilot tone, and the phase of the pilot tone are performed on a periodic basis to periodically update the pilot tone compensation factor.

In some embodiments of the method according to the first aspect, processing the initial waveform to generate the compensated waveform involves processing four initial waveforms to generate four compensated waveforms, each initial waveform representing one of an in-phase horizontal polarization component of an electric field of the optical signal, a quadrature-phase horizontal polarization component of the electric field, an in-phase vertical polarization component of the polarization component of the electric field, and a quadrature-phase vertical polarization component of the electric field. Each individual compensated waveform may be a function of a respective one of the four initial waveforms.

In some embodiments, calculating an intensity waveform in accordance with the compensated waveform comprises calculating the intensity waveform in accordance with all four compensated waveforms.

In some embodiments, the intensity waveform is equal to the sum of the squares of each of the compensated waveforms.

In some embodiments of the method according to the first aspect, processing the intensity waveform includes performing a Fourier transform of the intensity waveform.

According to a second aspect, the present disclosure provides an apparatus for receiving an optical signal that includes a pilot tone. The apparatus may include a dispersion compensation unit, a pilot tone compensation unit operatively coupled to the dispersion compensation unit, and a symbol decision unit operative coupled to the pilot tone compensation unit. The dispersion compensation unit may be configured to process an initial waveform to generate a compensated waveform. The processing may include at least dispersion compensation. The pilot tone compensation unit may be configured to: receive the compensated waveform; calculate an intensity waveform in accordance with the compensated waveform; process the intensity waveform to obtain a pilot tone frequency of the pilot tone, a modulation depth of the pilot tone, and a phase of the pilot tone; calculate a pilot tone compensation factor as a function of the pilot tone frequency, the modulation depth, and the phase; and multiply the compensated waveform with the pilot tone compensation factor to generate a modified compensated waveform. The symbol decision unit may be configured to receive the modified compensated waveform and determine a symbol carried by the modified compensated waveform.

In some embodiments of the apparatus according to the second aspect, the pilot tone compensation unit calculates the pilot tone compensation factor as a function of the pilot tone frequency, the modulation depth, and the phase of the pilot tone such that substantially half of the pilot tone in the compensated waveform is cancelled in the modified compensated waveform. For example, the pilot tone $$1 - \frac{1}{2}m_d \times \sin(1 + 2\pi f_{PT}t + \emptyset),$$

compensation factor may be equal to: where $m_d$ is the modulation depth of the pilot tone, $f_{PT}$ is the pilot tone frequency of the pilot tone, $\emptyset$ is the phase of the pilot tone, and t is time.

In some embodiments of the apparatus according to the second aspect, the pilot tone compensation unit: calculates the intensity waveform and processes the intensity waveform to obtain the pilot tone frequency of the pilot tone, the modulation depth of the pilot tone, and the phase of the pilot tone during a first time interval of a first length; monitors for detection of the pilot tone within a plurality of second time intervals of a second length, the second length being shorter than the first length; and selectively multiplies the compensated waveforms with the pilot tone compensation factor in a given second time interval of the plurality of second time intervals, responsive to detecting the pilot tone within a preceding second time interval of the plurality of second time intervals, wherein the preceding second time interval immediately precedes the given second time interval.

For example, in some such embodiments, the pilot tone compensation factor is equal to: $1-m_d \times \sin(1+2\pi f_{PT}t+\emptyset)$, where $m_d$ is the modulation depth of the pilot tone, $f_{PT}$ is the pilot tone frequency of the pilot tone, $\emptyset$ is the phase of the pilot tone, and t is time.

In some embodiments, the second length is shorter than a forward error correction (FEC) block duration, e.g., less than 20% of the FEC block duration.

In some embodiments of the apparatus according to the second aspect, the pilot tone compensation unit selectively multiplies the compensated waveforms with the pilot tone compensation factor by: responsive to detecting the pilot tone within one of the second time intervals, multiplying the compensated waveform with the pilot tone compensation factor in a subsequent second time interval; and responsive to not detecting the pilot tone within one of the second time intervals, not multiplying the compensated waveform with the pilot tone compensation factor in a subsequent second time interval.

In some embodiments of the apparatus according to the second aspect, the pilot tone compensation unit periodically updates the pilot tone compensation factor by periodically calculating the intensity waveform, processing the intensity waveform to obtain the pilot tone frequency of the pilot tone, the modulation depth of the pilot tone, and the phase of the pilot tone, and calculating the pilot tone compensation factor as a function of the pilot tone frequency, the modulation depth, and the phase.

In some embodiments of the apparatus according to the second aspect, the pilot tone compensation unit is configured to process the initial waveform to generate the compensated waveform comprises processing four initial waveforms to generate four compensated waveforms, each initial waveform representing one of an in-phase horizontal polarization component of an electric field of the optical signal, a quadrature-phase horizontal polarization component of the electric field, an in-phase vertical polarization component of the polarization component of the electric field, and a quadrature-phase vertical polarization component of the electric field, wherein each individual compensated waveform is a function of a respective one of the four initial waveforms.

In some such embodiments, the pilot tone compensation unit is configured to calculate the intensity waveform in accordance with all four compensated waveforms.

In some such embodiments, the intensity waveform is equal to the sum of the squares of each of the compensated waveforms.

In some embodiments of the apparatus according to the second aspect, the pilot tone compensation unit is configured to process the intensity waveform by performing a Fourier transform of the intensity waveform.

BRIEF DESCRIPTION OF THE DRAWINGS

Embodiments will now be described with reference to the attached drawings in which.

DETAILED DESCRIPTION

Generally, the present disclosure provides a method and system for pilot tone compensation in a coherent optical receiver by at least partially removing the pilot tone from an optical data signal via digital signal processing before a symbol decision is made. The pilot tone compensation provided by embodiments of the present disclosure reduces the pilot tone induced OSNR penalty. As a result, for a given pilot tone induced OSNR penalty, optical receivers incorporating pilot tone compensation in accordance with embodiments of the present disclosure can potentially accommodate an increased pilot tone modulation depth to improve the pilot tone SNR relative to an optical receiver without pilot tone compensation.

Figure 1:
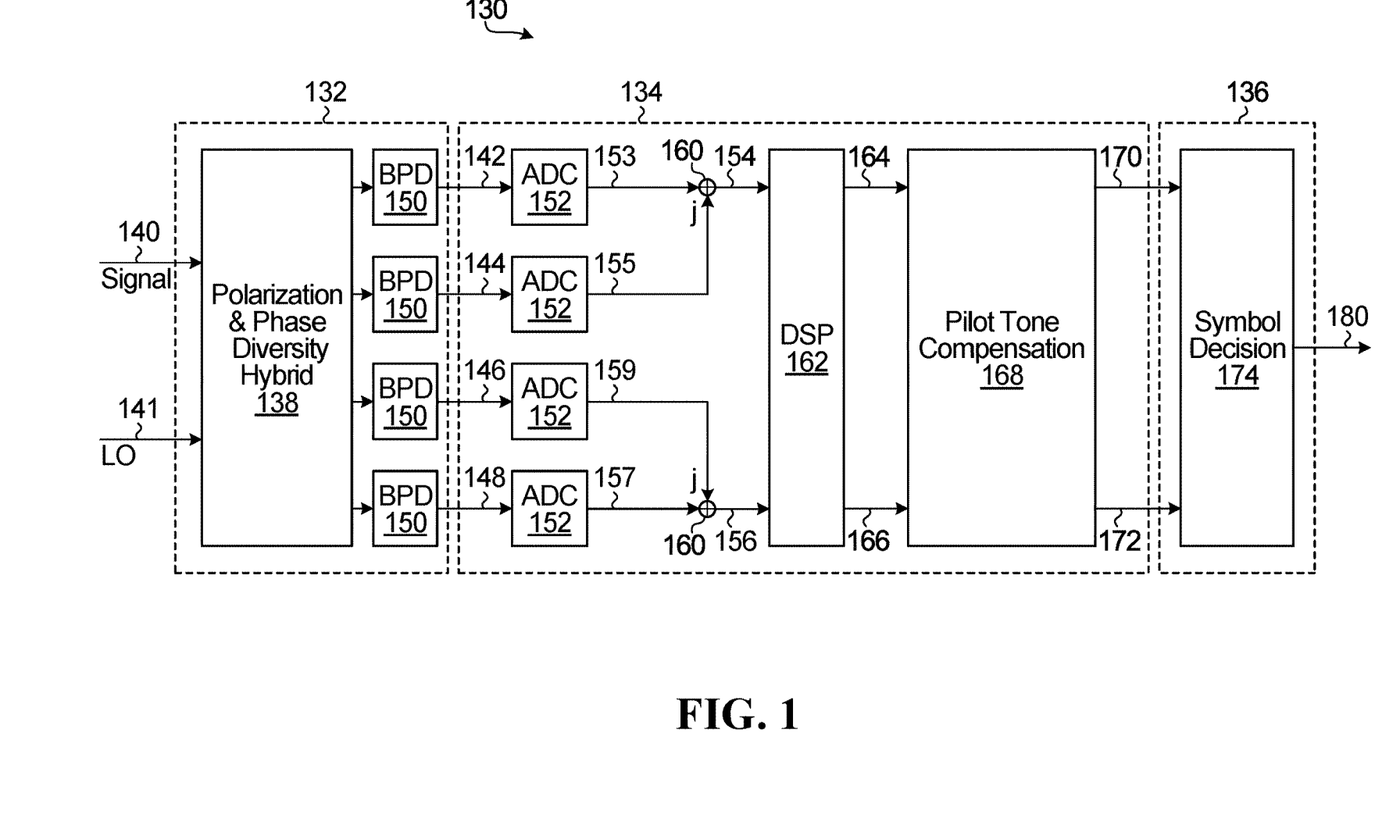
FIG. 1 is a block diagram of a coherent optical receiver with pilot tone compensation in accordance with an embodiment of the present disclosure.

FIG. 1 shows an example of a coherent receiver (Rx) 130 in accordance with an embodiment of the present disclosure. The coherent receiver 130 includes an optical-to-electrical converter unit 132, a signal processing unit 134 and a symbol decision unit 136. The optical-to-electrical converter 138 includes a polarization and phase diversity hybrid block 138, followed by four balanced photodetectors (BPDs) 150. The polarization and phase diversity hybrid block 138 and the four BPDs 150 convert the optical field of a single wavelength channel of an input two in-phase analog electrical signals and two quadrature-phase analog electrical signals. The two in-phase analog electric signals include signal 142, which represents the in-phase, horizontal polarization component of the electric field of the input optical signal channel, and signal 148, which represents the in-phase, vertical polarization component of the electric field of the input optical signal channel. The two quadrature-phase analog electric signals include signal 144, which represents the quadrature-phase, horizontal polarization component of the electric field of the input optical signal channel, and signal 146, which represents the quadrature-phase, vertical polarization component of the electric field of the input optical signal channel. The single channel is selected by tuning the local oscillator (LO) signal 141 to the center frequency of the channel.

The signal processing unit 134 includes four analog-to-digital converters (ADCs) 152, two digital complex combiners 160, a digital signal processing block 162 and a pilot tone compensation block 168. Each of the four analog electrical signals 142, 144, 146, 148 is received by the signal processing unit 134 at a respective ADC 152. The ADCs 152 output four digital signals or waveforms 153, 155, 155, and 159.

The digital signal waveforms 153 and 155, which represent the in-phase and quadrature components of the horizontal polarization component of the electrical field of the input optical signal channel are complexly combined by a first one of the digital complex combiners 160 to generate a complex digital waveform 154. More specifically, the first digital complex combiner 160 multiplies the digital signal waveform 155 (the quadrature component of the horizontal component) by j which is the $\sqrt{-1}$ and sums the result with the digital signal waveform 153 (the in-phase component of the horizontal polarization component) to generate the complex digital waveform 154. The digital waveforms 157 and 159, which represent the in-phase and quadrature components of the vertical polarization component of the electrical field of the input optical signal channel, are similarly complexly combined by the other digital complex combiner 160 to generate a complex digital waveform 156.

The DSP block 162 receives the digital waveforms 154 and 156 and processes them to obtain compensated waveforms 164 and 166. The processing performed by the DSP block 162 includes dispersion compensation to compensate for chromatic dispersion that may be present in the input optical signal 140. The DSP block 162 may also perform other conventional compensation/signal processing processes, such as bandwidth compensation, clock/carrier phase recovery, re-sampling, equalization, and other digital signal processing functions that may be necessary for coherent detection. In the example embodiment shown in FIG. 1, the digital complex combiners 160 are used to complexly combine the in-phase and quadrature components of the horizontal and vertical components of the electrical field of the input optical signal to generate the two complex digital waveforms 156, and therefore the DSP 162 is shown as receiving the two complex digital signal waveforms 154 and 156. In other embodiments, the functionality of the digital complex combiners 160 may be incorporated into the DSP 162, such that the DSP receives the four real signals 153, 155, 159 and 157 and complexly combines them into two complex signals.

Pilot tone compensation block 168, which may be implemented with a digital signal processing unit or an application specific integrated circuit, receives the compensated waveforms 164 and 166 from DSP block 162, calculates a pilot tone compensation factor that, as will be described below, can be used to at least partially compensate for a pilot tone modulation induced OSNR penalty, multiplies the pilot tone compensation factor with the compensated waveforms 164 and 166 to generate modified compensated waveforms 170 and 172.

The symbol decision unit 136 includes a symbol decision block 174 that receives the modified compensated waveforms 170 and 172, based upon which it outputs a symbol decision 180.

Pilot tone compensation block 168 can process the compensated waveforms 164 and 166, obtained from DSP block 162, to calculate the values of the modulation depth factor $m_d$, the pilot tone frequency $f_{PT}$, and the phase factor $\emptyset$ of the optical signal modulated by a pilot tone signal, and to obtain the pilot tone compensation factor that, when multiplied with the compensated digital signals 164 and 166, can at least partially compensate for an OSNR penalty induced by the pilot tone.

Figure 2:
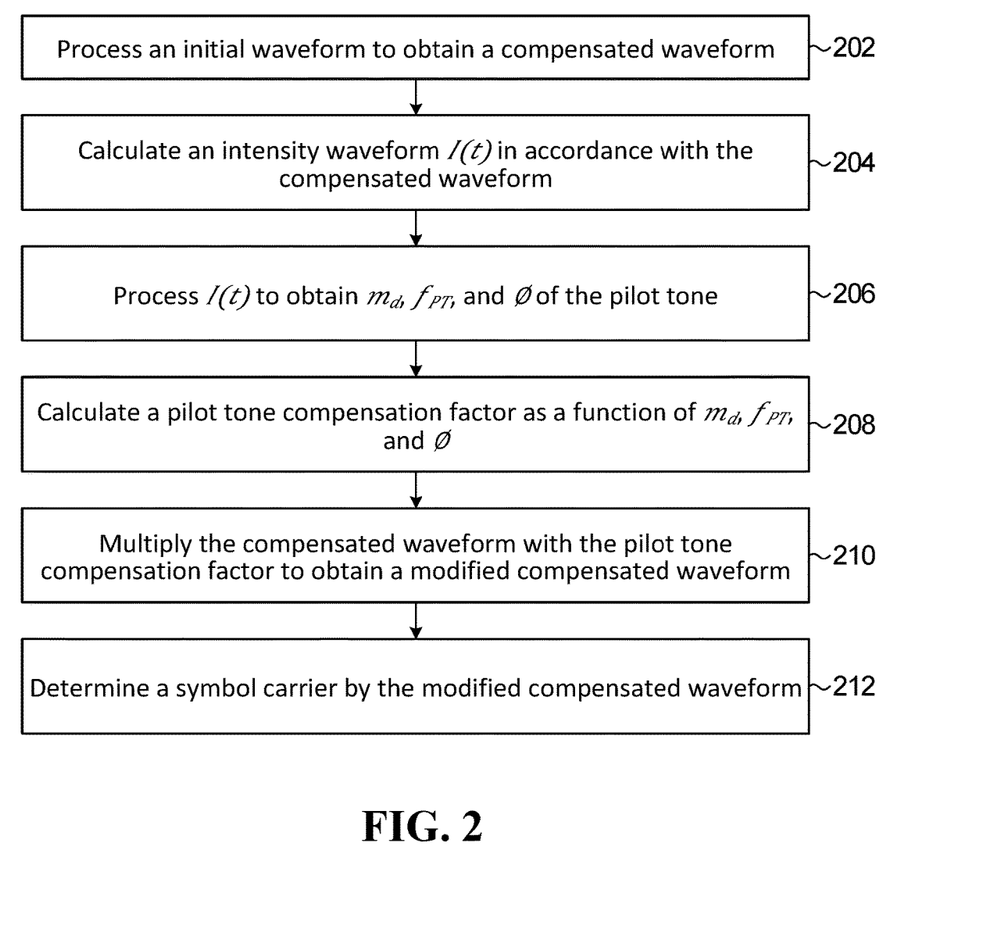
FIG. 2 is a flow diagram of an example method according to an embodiment of the present disclosure.

The processing of the compensated waveforms 164 and 166 can be implemented, for example, in accordance with FIG. 2, which is a flow diagram of example operations 200 in an apparatus for receiving an optical signal that includes a pilot tone according to example embodiments described herein. Operations 200 may be indicative of operations occurring in an optical receiver at a node in a DWDM optical network, for example.

Operations 200 begin at 202 with the DSP block 162 processing the initial waveforms 154 and 156 to obtain compensated waveforms 164 and 166. As noted above, the processing includes dispersion compensation so that chromatic dispersion that may be present in an input optical signal is removed before pilot tone compensation is applied.

In some instances, the electric field component of an optical signal modulated by a pilot tone signal can be expressed, in the time domain, as:

$$E(t)=E_0(t)(1+m_d \sin(2\pi f_{PT}t)), \quad (1)$$

where $E_0(t)$ is the unmodulated electric field component of the optical signal, $m_d$ is a modulation depth factor and has a value that is less than 1 (e.g., $m_d$=0.1), $f_{PT}$ is the pilot tone frequency, and t is time. For example, if the input optical signal 140 has a pilot tone identifying the wavelength of the input optical signal, the electric field components of the optical signal modulated by the pilot tone signal, or of the electrical signal waveforms 142, 144, 146 and 148 representing the optical input signal modulated by the pilot tone signal, may be expressed, in the time domain, as:

$$E_{hi}^{PT}(t) = [1 + m_d \sin(1 + 2\pi f_{PT}t + \emptyset)]E_{hi}(t); \quad (2)$$

$$E_{hq}^{PT}(t) = [1 + m_d \sin(1 + 2\pi f_{PT}t + \emptyset)]E_{hq}(t); \quad (3)$$

$$E_{vi}^{PT}(t) = [1 + m_d \sin(1 + 2\pi f_{PT}t + \emptyset)]E_{vi}(t); \quad (4)$$

$$E_{vq}^{PT}(t) = [1 + m_d \sin(1 + 2\pi f_{PT}t + \emptyset)]E_{vq}(t), \quad (5)$$

$E_{hi}(t)$ is the in-phase, horizontal polarization component of the electric field of the optical data signal; $E_{hq}(t)$ is the quadrature-phase, horizontal polarization component of the electric field of the optical data signal; $E_{vi}(t)$ is the in-phase, vertical polarization component of the electric field of the optical data signal; and $E_{vq}(t)$ is the quadrature-phase, vertical polarization component of the electric field of the optical data signal. The pilot tone frequency may be set in accordance with the wavelength of the optical data signal. For example, there can be predetermined optical data signal wavelengths that each has associated thereto a specific pilot tone frequency. The four equations above can be re-written simply as:

$$E_k^{PT}(t)=[1+m_d \sin(1+2\pi f_{PT}t+\emptyset)]E_k(t), \quad (6)$$

where k=hi, hq, vi, or vq.

The electric fields of four digital signals or waveforms 153, 155, 157, and 159 output from the ADCs 152 also have the same form as represented by equation (6).

At 204, the pilot tone compensation block 168 calculates an intensity waveform I(t) of the selected channel of the input optical signal 140 in accordance with at least one of the compensated waveforms 164,166. For example, the intensity waveform I(t) may be calculated as the sum of the squares of the compensated waveforms in accordance with:

$$I(t)=\Sigma_k|E_k^{PT}(t)|^2=|E_{hi}^{PT}(t)|^2+|E_{hv}^{PT}(t)|^2+|E_{vi}^{PT}(t)|^2+|E_{vq}^{PT}(t)|^2. \quad (7)$$

Subsequently, at 206, the pilot tone compensation block 168 processes the intensity waveform I(t) to obtain the modulation depth $m_d$ of the pilot tone, the pilot tone frequency $f_{PT}$ of the pilot tone and the phase Ø of the pilot tone. For example, the processing may involve performing a Fast Fourier Transform of I(t) to obtain $m_d$, $f_{PT}$ and Ø of the pilot tone. In order to reduce the number of data points to be processed by the pilot tone compensation block 168, block averaging or sliding window averaging can be applied before performing the Fast Fourier Transform. Any other suitable type of transform of I(t), to obtain $m_d$, $f_{PT}$ and Ø of the pilot tone can be performed. Such transforms include, for example a Goertzel algorithm.

In some embodiments, once the pilot tone frequency has been determined, it is possible to compare the determined value of the pilot tone frequency against set values of pilot tone frequencies and to correct the determined frequency in accordance with the closest set pilot tone frequency value. As an example, if the determined pilot tone frequency is 20.004 MHz and the closet set pilot tone frequency is 20.000 MHz, then the 20.004 MHz value is replaced with the 20.000 MHz value and the calculation of the pilot tone compensation factor is done with the 20.000 MHz value as well as with the determined values for $m_d$ and Ø.

The correction of the determined frequency can be effected by storing a lookup table of standard pilot tone frequencies in a memory operationally connected to the pilot tone compensation block 168, which may then compare the determined value of the pilot tone frequency with the pilot tone frequency values of the lookup table and replace the determined pilot tone frequency with a frequency of the lookup table that is the closest to the determined pilot tone frequency.

Once these values have been obtained, the pilot tone compensation block 168 calculates, at 208, a pilot tone compensation factor as a function of $m_d$, $f_{PT}$ and Ø. Various examples of how the pilot tone compensation factor may be calculated at 208 are described later with reference to FIGS. 3-5.

At 210, the pilot tone compensation block 168 multiplies the compensated waveforms 164 and 166 with the pilot tone compensation factor to obtain modified compensated waveforms 170 and 172 in which the pilot tone modulation has been at least partially compensated.

At 212, the symbol decision block 174 determines a symbol carried by the modified compensated waveforms 170 and 172.

The example operations 200 are illustrative of an example embodiment. Various ways to perform the illustrated operations, as well as examples of other operations that may be performed, are described herein. Further variations may be or become apparent.

For example, if the electric field component of an optical signal modulated by a pilot tone signal can be expressed according to equation (6), the pilot tone can be removed by applying a modulation with the same frequency, and amplitude, but opposite phase, on the optical electrical field waveforms.

However, in some cases a pilot tone may be modulated/turned on/off in order to carry additional information. For example, a pilot tone may be turned on/off according to a spectrum spreading code. Due to the general randomness of the pilot tone data, it is generally not possible to know the exact timing of when the on/off transitions of the pilot tone are to occur. To address this potential issue, in some embodiments the pilot tone compensation block 168 is configured to calculate a pilot tone compensation factor that only compensates for a portion of the pilot tone modulation that is detected.

For example, in some embodiments, the pilot tone compensation block 168 is configured to calculate the pilot tone compensation factor such that substantially half of the pilot tone in the compensated waveforms is cancelled in the modified compensated waveforms at all times. For example, if the compensated waveforms at the input of the pilot tone compensation block 168 can be expressed according to equation (6), i.e., $E_k^{PT}(t)=[1+m_d \sin(1+2\pi f_{PT}t+\emptyset)]E_k(t)$, where k=hi, hq, vi, or vq, in such embodiments the pilot tone compensation factor may be calculated according to:

$$\text{pilot tone compensation factor} = 1 - \frac{1}{2}m_d \sin(1 + 2\pi f_{PT}t + \emptyset). \quad (8)$$

Thus, multiplying the compensated waveforms 164 and 166, which can be represented by the time-varying equation (6) by the pilot tone compensation factor of equation (8) at 210 yields:

$$E'_k(t) = \left[1 - \frac{1}{2}m_d\sin(1 + 2\pi f_{PT}t + \emptyset)\right]\left[1 + m_d\sin(1 + 2\pi f_{PT}t + \emptyset)\right]E_k(t) = \left[1 + \frac{1}{2}m_d\sin(1 + 2\pi f_{PT}t + \emptyset) - \frac{1}{2}m_d^2(\sin(1 + 2\pi f_{PT}t + \emptyset))^2\right]E_k(t), \quad (9)$$

which, as $m_d$ is less (or much less) than one, can be approximated as:

$$E'_k(t) = \left[1 + \frac{1}{2}m_d\sin(1 + 2\pi f_{PT}t + \emptyset)\right]E_k(t), \quad (10)$$

which is equivalent to the time-varying equation (6) but with only half the pilot tone modulation. Note that because the detection of the pilot tone, including the determination of the pilot tone frequency, modulation depth (amplitude) and phase, and the pilot tone compensation are done at different times, the phase Ø should be adjusted to account for the time difference. More specifically, the phase Ø should be adjusted considering the pilot tone frequency $f_{PT}$ and the time difference between when the pilot tone phase is determined and when the pilot tone compensation factor is applied.

Figure 3:
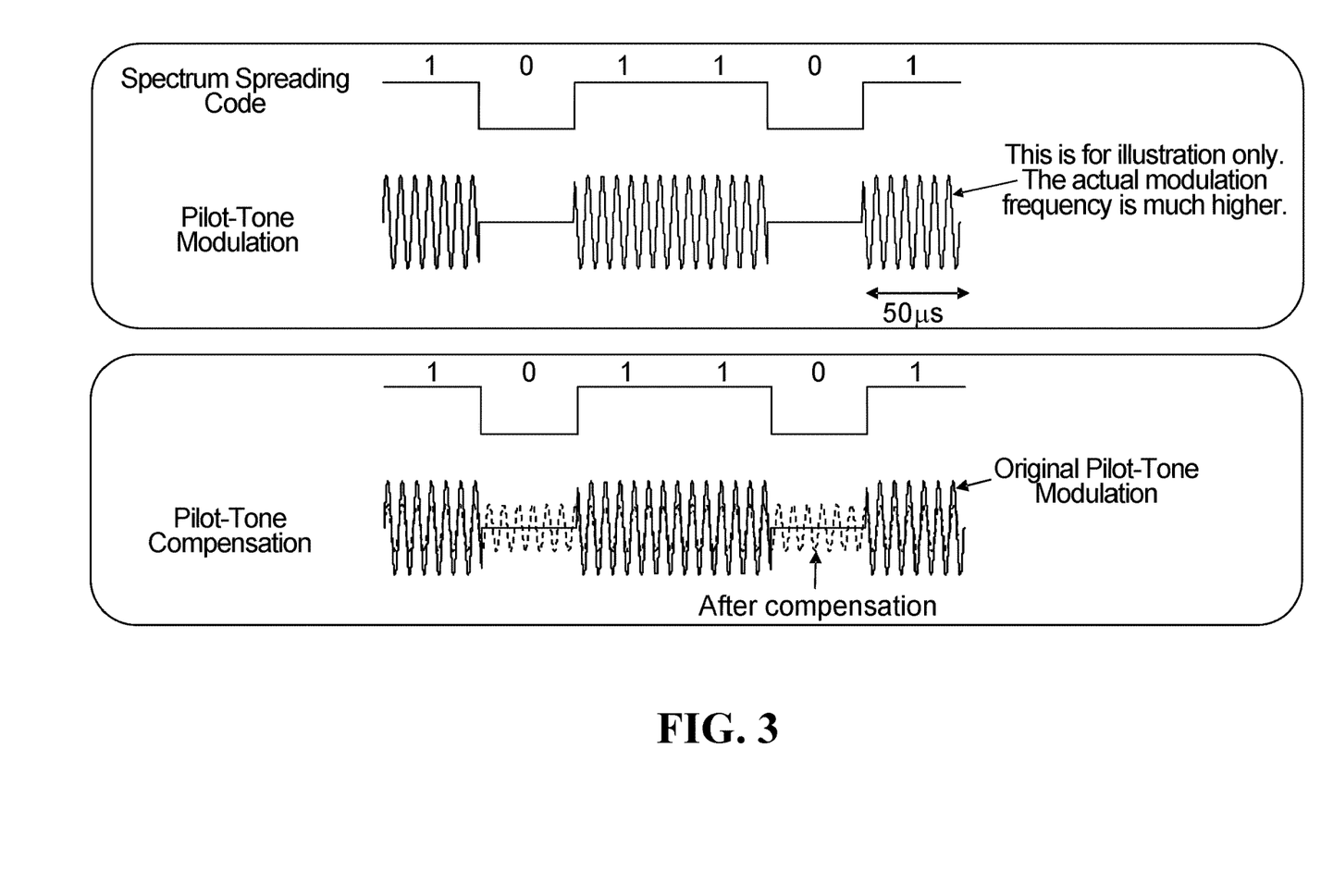
FIG. 3 shows results of pilot tone compensation according to an embodiment of the present disclosure for a pilot tone modulated by a spectrum spreading code.

FIG. 3 shows an example of such an embodiment where half of the pilot tone modulation is compensated at all times. As shown in FIG. 3, even though the pilot tone is turned on/off according to a spectrum spreading code, the pilot tone compensation factor is calculated such that half of the pilot tone modulation is compensated at all times. It is noted that the application of such a pilot tone compensation factor during those times when the pilot tone is turned off introduces an undesirable pilot tone modulation when it would otherwise not be present (because the pilot tone is turned off). However, the net result is still beneficial because the reduction in pilot tone modulation by half, i.e. reducing the effective pilot tone modulation depth by a factor of two, reduces the pilot tone induced OSNR penalty expressed in dB by a factor of four. This is because, as will be discussed in further detail later on with reference to FIG. 6 and equation (17), the pilot tone induced OSNR penalty expressed in dB is proportional to the square of the modulation depth. The pilot tone frequency $f_{PT}$ and amplitude/modulation depth $m_d$ may be relatively stable/fixed, and the pilot tone phase Ø may be continuous across bit intervals of the spectrum spreading code. As such, the parameters upon which the pilot tone compensation factor is based, namely $m_d$, $f_{PT}$ and Ø, may be obtained using relatively long measurement times in order to get accurate values. Changes in the pilot tone frequency $f_{PT}$ and amplitude/modulation depth $m_d$ may be tracked by performing the measurements on a periodic basis to periodically update the pilot tone compensation factor.

In other embodiments, rather than compensating for only a portion of the pilot tone modulation at all times, the pilot tone compensation block 168 calculates a pilot tone compensation factor that compensates for all of the pilot tone modulation, but only selectively applies the compensation when the pilot tone is detected. The pilot tone compensation block 168 may do this by accurately measuring the pilot tone frequency, modulation depth and phase over a relatively long time interval as described above with respect to the previous embodiment, but also monitors for detection of the pilot tone over much shorter time intervals. If a pilot tone is detected in one of the short time intervals, the pilot tone compensation factor that was calculated based on the parameters measured in the long time interval is used in the subsequent short time interval to compensate for the detected pilot tone modulation. In such embodiments the pilot tone compensation factor may be calculated according to:

$$\text{pilot tone compensation factor}=1-m_d \sin(1+2\pi f_{PT}t+\emptyset). \quad (11)$$

which is equivalent to a modulation with the same frequency, $f_{PT}$, and amplitude, but opposite phase as the pilot tone modulation factor of equation (6).

Multiplying the compensated waveforms 164 and 166, which can be represented by the time-varying equation (6) by the pilot tone compensation factor of equation (11) yields:

$$E'_k(t)=[1-m_d \sin(1+2\pi f_{PT}t+\emptyset)][1+m_d \sin(1+2\pi f_{PT}t+\emptyset)]E_k(t)=E_k(t)+O(m_d^2), \quad (12)$$

which, as $m_d$ is less (or much less) than one, can be approximated as:

$$E'_k(t)=E_k(t), \quad (13)$$

which is free from a pilot tone component.

Here again it is noted that because the detection of the pilot tone, including the determination of the pilot tone frequency, modulation depth (amplitude) and phase, and the pilot tone compensation are done at different times, the phase Ø should be adjusted considering the pilot tone frequency $f_{PT}$ and the time difference between when the pilot tone phase is determined and when the pilot tone compensation factor is applied.

In this case, 100% of the pilot tone detected in the previous short time interval may be compensated in the subsequent short time interval, thereby providing better pilot tone compensation within the subsequent time interval than if only a portion of the pilot tone modulation were compensated.

Figure 4:
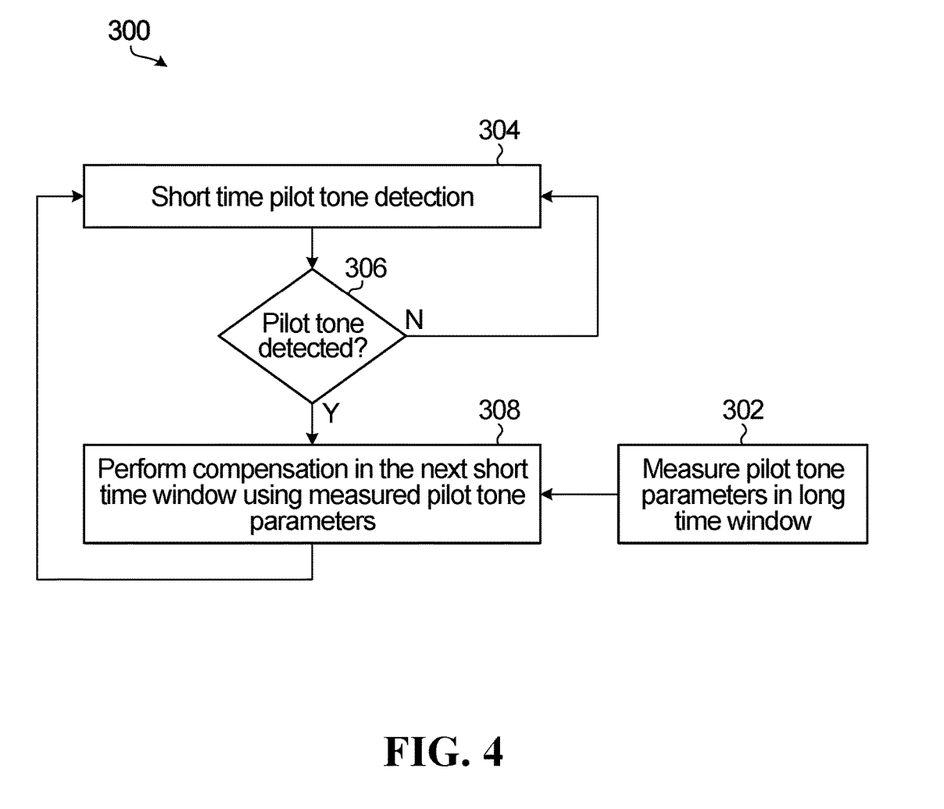
FIG. 4 is a flow diagram of another example method according to an embodiment of the present disclosure.
Figure 5:
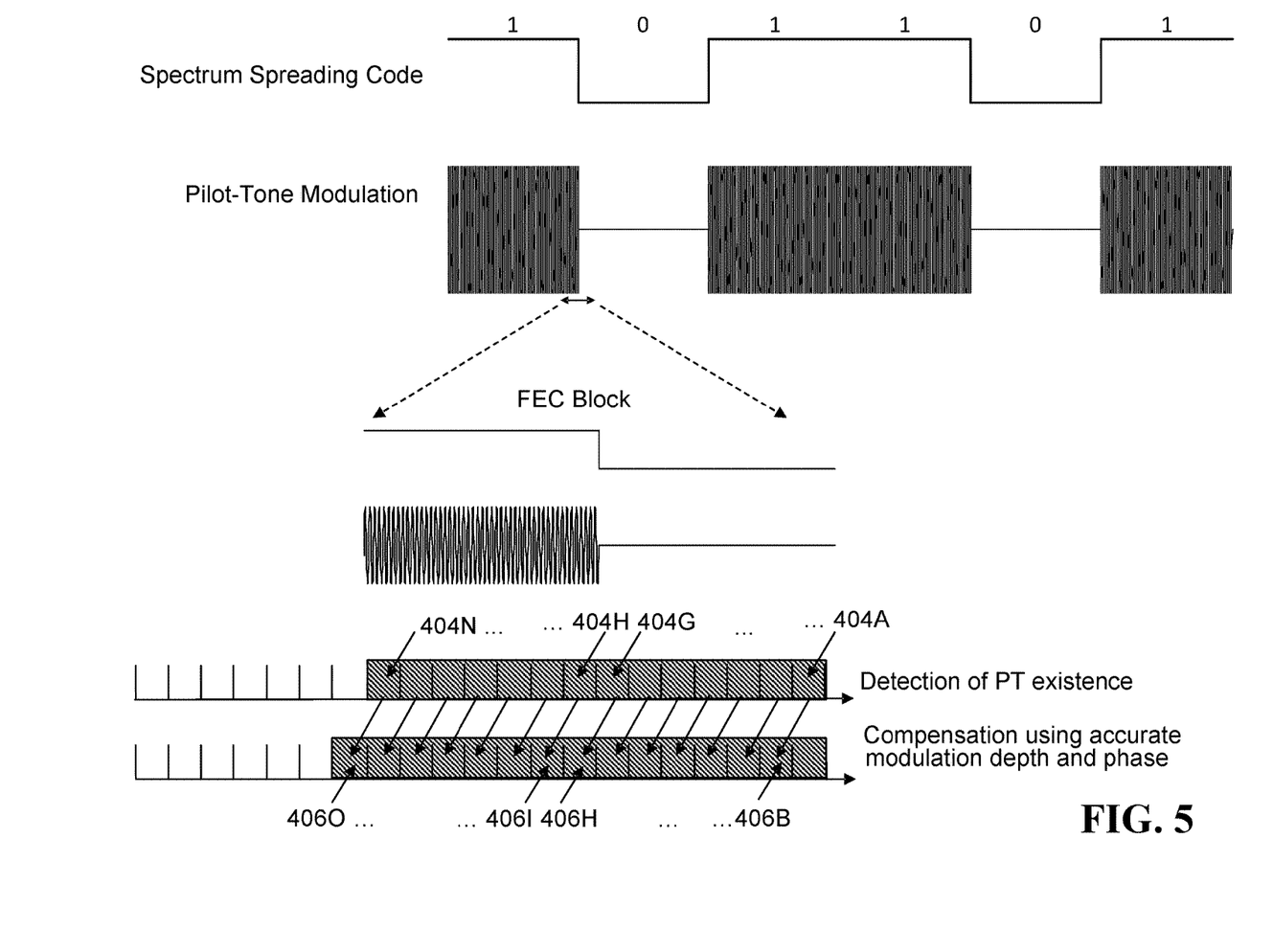
FIG. 5 shows results of pilot tone compensation according to another embodiment of the present disclosure for a pilot tone modulated by a spectrum spreading code.

FIG. 4 is a flow diagram of example operations 300 in accordance with such an embodiment. Operations 300 begin at 302 with the pilot tone compensation block 168 measuring pilot tone parameters in a long time window/interval. This may involve calculating an intensity waveform I(t) of the selected channel of the input optical signal 140 in accordance with at least one of the compensated waveforms 164,166, processing the intensity waveform I(t) as previously described to obtain $m_d$, $f_{PT}$, and Ø of the pilot tone, and calculating a pilot tone compensation factor as shown at steps 204, 206 and 208 of FIG. 2.

At 304, the pilot tone compensation block 168 performs short time pilot detection within short time windows. The short time windows may be configured so that they are much shorter than a Forward Error Correction (FEC) code block duration of data carried by the optical signal 140, e.g., $\frac{1}{10}^{th}$ of the FEC block length.

At 306, if a pilot tone is detected in a given short time window, the pilot tone compensation block 168 then performs compensation in the next short time window at 308 using the pilot tone compensation factor that it calculated based on the pilot tone parameters that it measured in the long time window. This may involve multiplying the compensated waveforms 164 and 166 with the pilot tone compensation factor to obtain modified compensated waveforms 170 and 172 as shown at step 210 of FIG. 2. In this case, the pilot tone compensation factor may be calculated so that it compensates for substantially all of the pilot tone modulation. If the pilot tone is turned on/off as described previously, it is possible that the pilot tone modulation may be incorrectly compensated at the on/off transitions. However, if the short time windows are configured to be much shorter than the FEC code block duration, e.g. $\frac{1}{10}^{th}$ of the FEC code block duration, then the mis-compensation time is much shorter than the FEC code block duration, and therefore has very little impact. Furthermore, due to the short detection time, there may be only a small probability of mis-detection. This operation is shown by way of an example timing diagram in FIG. 5, which shows a series of short time intervals 404 within which the fast pilot tone detection is performed, and another series of short time intervals 406 within which the pilot tone compensation is performed using the pilot tone compensation factor that was calculated based on measurements of the pilot tone parameters in a long time window. More specifically, it can be seen that the pilot tone is "off" in the short detection time interval 404A, and therefore no pilot tone is detected in 404A and no compensation is applied in the subsequent short compensation time interval 406B. However, the pilot tone is "on" and is detected in detection time intervals 404H-404N, and therefore pilot tone compensation is performed in subsequent short compensation time intervals 406I-406O. This means that the pilot tone is not correctly compensated in short compensation time interval 406H (because the pilot tone signal was not detected in short time detection interval 404G). However, as noted above, the impact of this mis-compensation is small because the duration of each short time interval is much smaller than the duration of the FEC code block. In light of this, in some embodiments the short time intervals may be configured so that they are less than 10% of the length of an FEC code block. In other embodiments, the short time intervals may be longer than 10% of the FEC code block, e.g., up to 20% or more of the FEC code block duration. The use of longer durations for the short time intervals may result in poorer compensation as a result of the impact of mis-compensation over the longer duration short time intervals.

As noted above, in some instances the electric field component of an optical signal modulated by a pilot tone signal can be expressed, in the time domain, according to equation (1), i.e., $E(t)=E_0(t)(1+m_d \sin(2\pi f_{PT}t))$, where $E_0(t)$ is the unmodulated electric field component of the optical signal, $m_d$ is a modulation depth factor and has a value that is less than 1 (e.g., $m_d$=0.1), $f_{PT}$ is the pilot tone frequency, and t is time.

In such cases, the pilot tone modulation induced "noise" power can be expressed, in the time domain, as:

$$n_{PT} = \overline{|E_0(t)|^2} m_d^2 \sin^2(2\pi f_{PT}t) = 0.5\overline{|E_0(t)|^2} m_d^2 \quad (14)$$

This "noise" power is proportional to the square of the modulation depth $m_d$. If this "noise" power is white within a signal bandwidth B, then its signal normalized power in a 0.1 nm bandwidth, $B_{0.1\ nm}$, can be expressed as:

$$n_{PT\_0.1nm} = \frac{B_{0.1nm}}{B} 0.5 m_d^2. \quad (15)$$

For a linear OSNR of $OSNR_{lin}$, the corresponding signal normalized ASE noise in 0.1 nm bandwidth can be expressed as:

$$n_{ASE\_0.1nm} = \frac{1}{OSNR_{lin}}. \quad (16)$$

Therefore, the OSNR penalty in dB can be expressed as:

$$\Delta OSNR_{dB} = \quad (17)$$
$$10\log_{10}\left(\frac{n_{ASE\_0.1nm} + n_{PT\_0.1nm}}{n_{ASE\_0.1nm}}\right) = \frac{5}{\ln 10} OSNR_{lin} \frac{B_{0.1nm}}{B} m_d^2.$$

Figure 6:
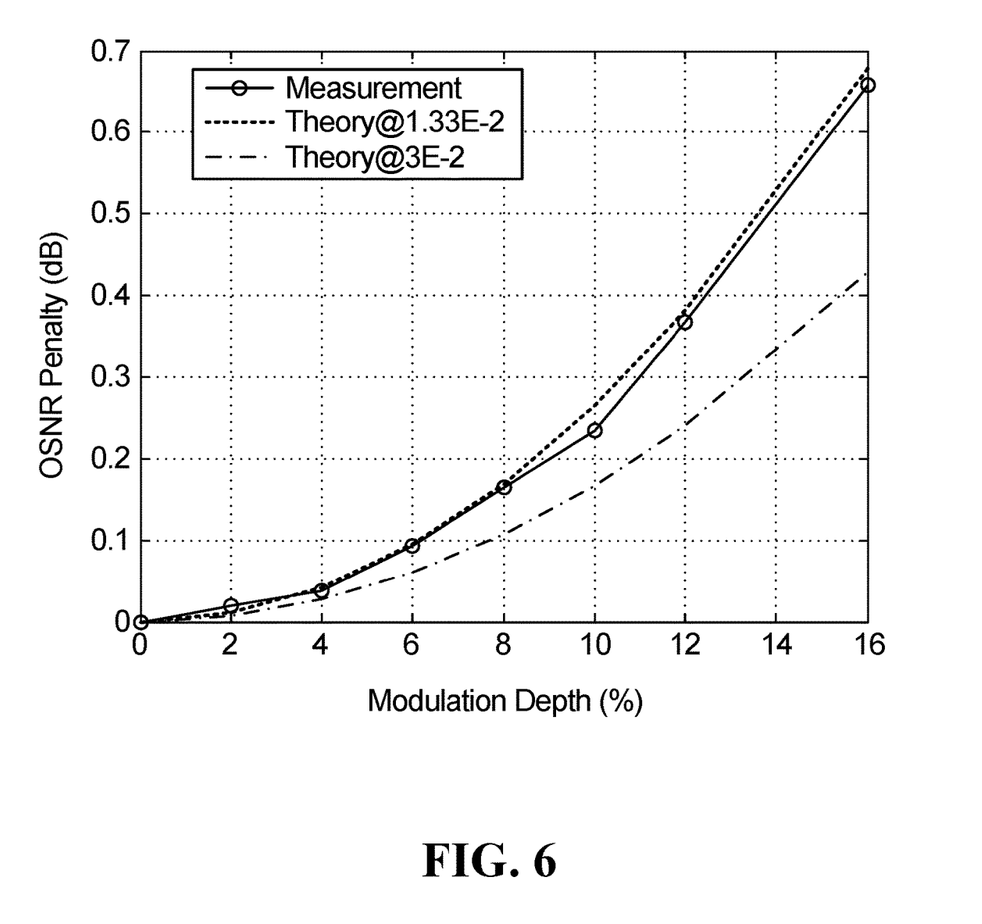
FIG. 6 is a plot of two theoretical results and a measurement result of the OSNR penalty in dB for a 16 quadrature amplitude modulated (16QAM) optical signal modulated with a pilot tone signal.

Both the theoretical result predicted by equation (5) and experimental measurements have shown that the pilot tone induced OSNR penalty expressed in dB is proportional to the square of the modulation depth $m_d$. For example, FIG. 6 shows a plot of two theoretical results in accordance with equation (17) above and a measurement result of the OSNR penalty in dB for a 16 quadrature amplitude modulated (16QAM) optical signal modulated with a pilot tone signal. As shown in FIG. 6, there is approximately a 0.2 dB OSNR penalty induced by pilot tone modulation at a typical modulation depth of 8-12%. In general, the penalty would be larger for higher order modulations, e.g., at least ⅔ times larger 32QAM/64QAM. Furthermore, modulations depths that are larger than those that are currently typically used in many optical communications networks may be used in the future. For these reasons, it would be desirable to provide a mechanism to reduce the pilot tone induced OSNR penalty at an optical receiver by at least partially removing the pilot tone from an optical data signal.

U.S. Pat. No. 9,473,263 discloses a coherent waveform conversion apparatus that can be used in coherent optical-fiber transmission systems to convert an input optical waveform at a first wavelength to an output optical waveform at a second wavelength without consideration for the format type of the data encoded in the optical signal. When operating in an environment where an input waveform has a pilot tone associated thereto, the apparatus allows for the removal of the pilot tone from the input waveform, and also allows for the addition of another pilot to the output waveform. The pilot tone removal mechanism disclosed in U.S. Pat. No. 9,473,263 is for removing a pilot tone in a digital wavelength converter (DWC) that converts an input waveform at a first wavelength to an output waveform at a second wavelength independently of the format in which optical data may be encoded. In other words, there is no consideration given to the impact the pilot tone modulation has on the OSNR of the high speed optical data signal, because the high speed optical data signal is not decoded in the DWC's wavelength conversion process. Furthermore, the impact of pilot tone modulation on the OSNR of an optical data signal cannot be completely removed if dispersion, such as chromatic dispersion, is not properly compensated.

As noted earlier, the electric field component of an optical signal modulated by a pilot tone signal can be expressed, in the time domain, as $E(t)=E_0(t)(1+m_d \sin(2\pi f_{PT}t))$. With the time domain response of dispersion h(t) added, the above equation becomes:

$$E'(t)=(E_0(t)(1+m_d \sin(2\pi f_{PT}t))) \otimes h(t) \quad (18)$$

If the above equation (18) is multiplied by the pilot tone compensation factor provided in equation (11) in accordance with equation (12) without first applying dispersion compensation to compensate for the time domain response of dispersion h(t), the result would be as follows (ignoring the $O(m_d^2)$ component):

$$E'_c(t)=E'(t)(1-m_d \sin(2\pi f_{PT}t)) \approx E_0(t) \otimes h(t)+m_d \Delta E_a(t)-m_d \Delta E_b(t), \quad (19)$$

where $$\Delta E_b(t)=(E_0(t)\sin(2\pi f_{PT}) \otimes h(t); \quad (20)$$

$$\Delta E_a(t)=\{E_0(t) \otimes h(t)\} \sin(2\pi f_{PT}). \quad (21)$$

Figure 7A:
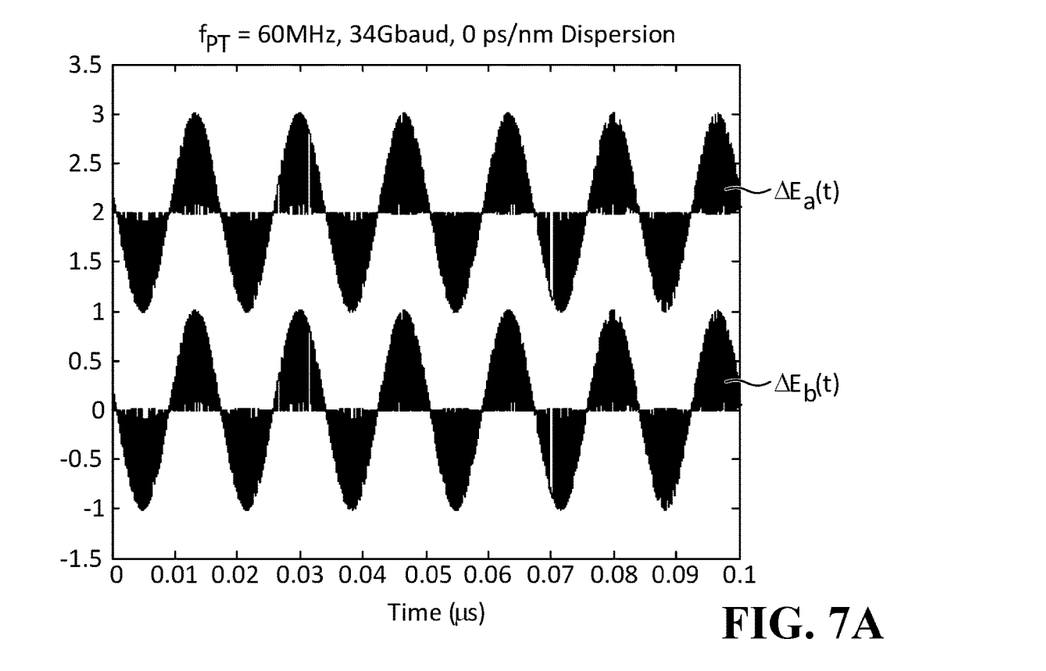
FIGS. 7A, 8A and 9A show plots of simulation results of $\Delta E_a(t)$ and $\Delta E_b(t)$ for three different amounts of dispersion, respectively.
Figure 7B:
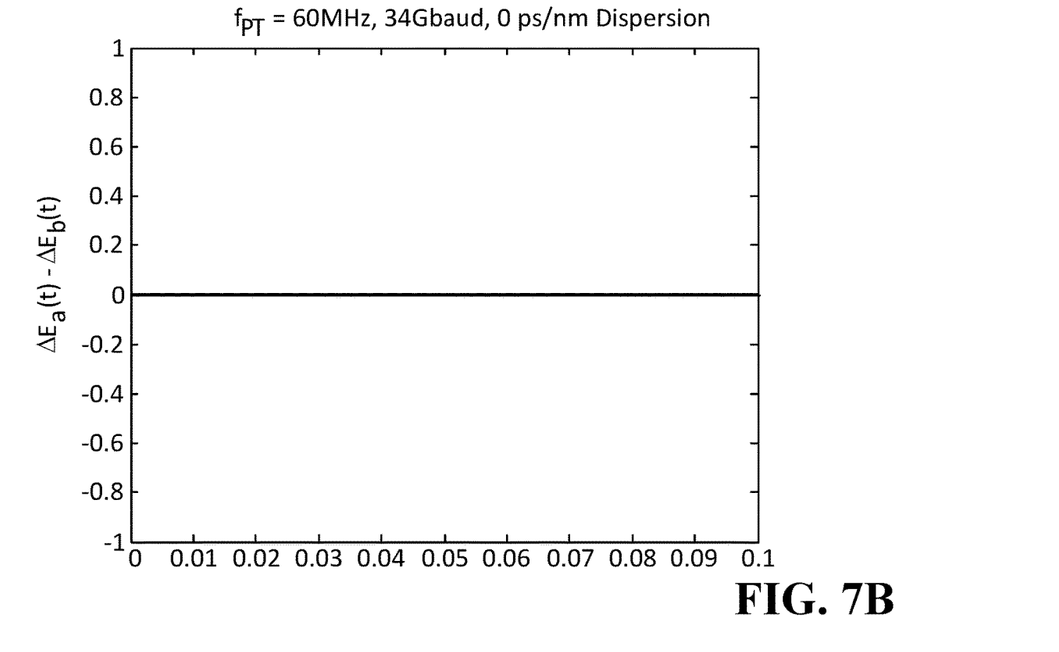
FIGS. 7B, 8B and 9B show plots of $\Delta E_a(t) - \Delta E_b(t)$ corresponding to FIGS. 7A, 8A and 9A, respectively.
Figure 8A:
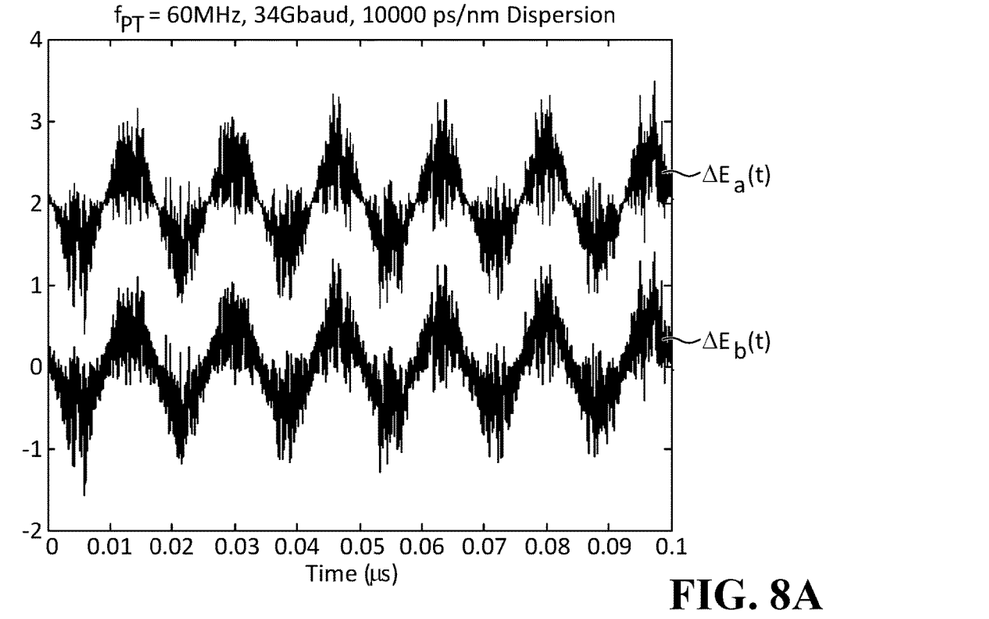
Figure 8B:
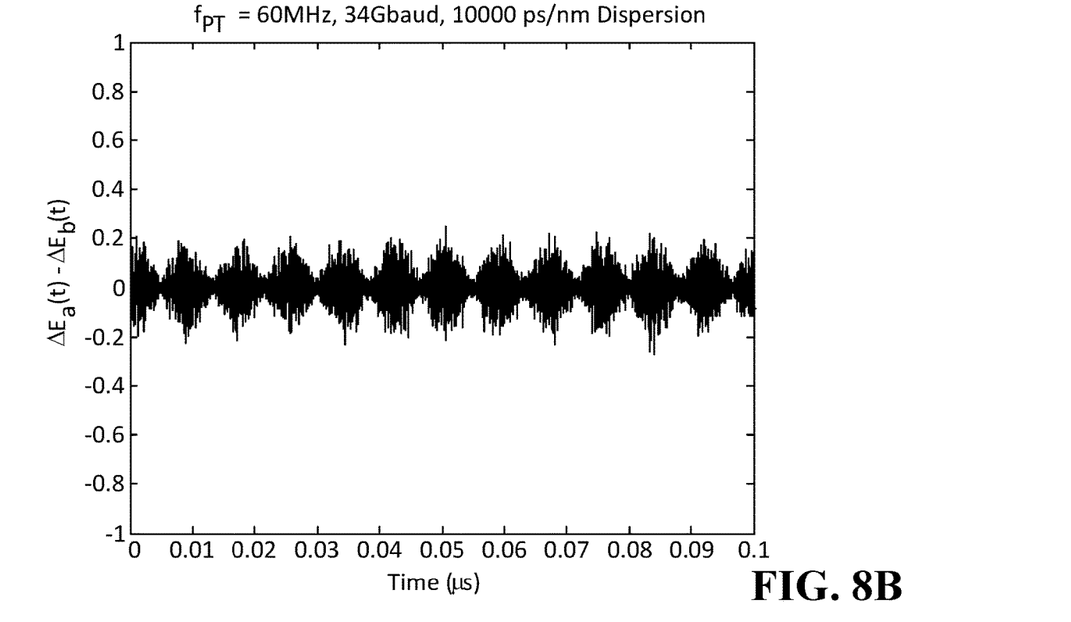
Figure 9A:
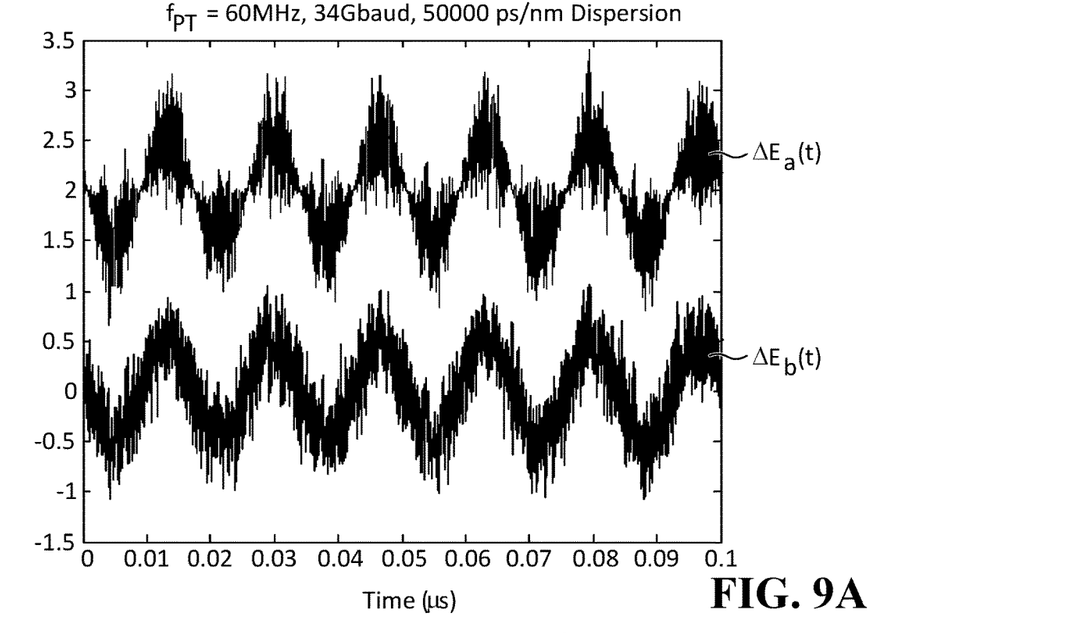
Figure 9B:
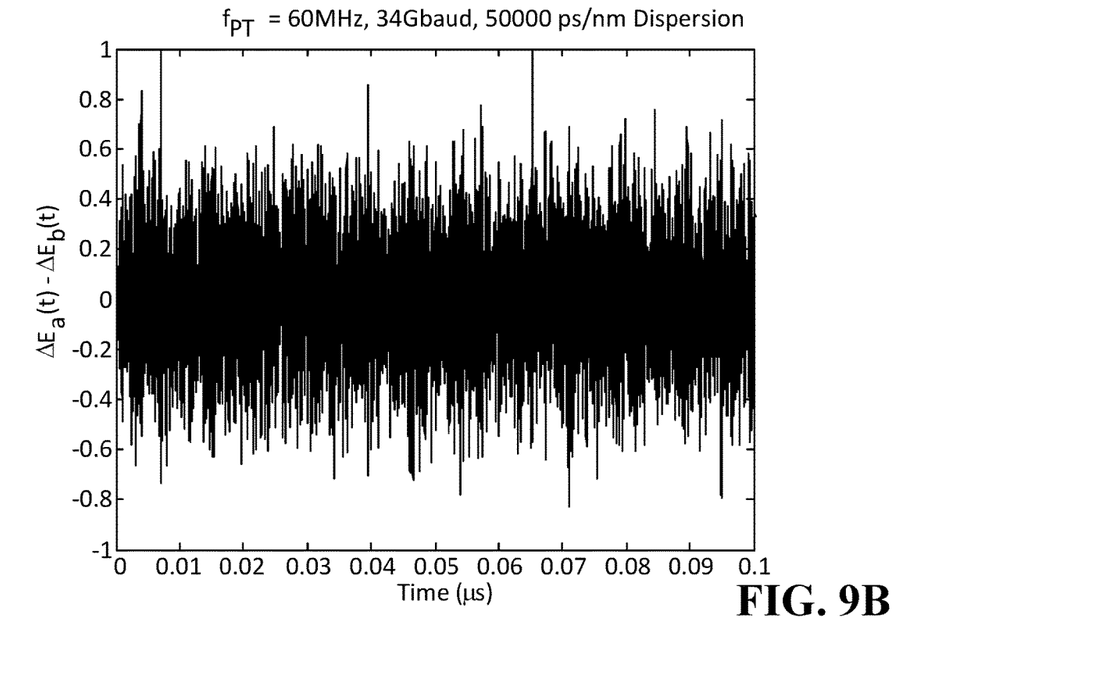

Generally, for non-zero dispersion, $\Delta E_a(t)$ and $\Delta E_b(t)$ are not the same, and therefore the pilot tone modulation cannot be completely compensated if the dispersion is not compensated. This is illustrated by way of example in FIGS. 7A, 7B, 8A, 8B, 9A and 9B. In particular, FIGS. 7A, 8A and 9A show plots of simulation results of $\Delta E_a(t)$ and $\Delta E_b(t)$ for $f_{PT}=60$ MHz and a 34G baud rate, with three different amounts of dispersion. More specifically, the simulation result in FIG. 7A is for 0 ps/nm of dispersion added after pilot tone modulation is applied, while the simulation results in FIGS. 8A and 9A are for 10 000 ps/nm and 50 000 ps/nm of dispersion, respectively. It is noted that $\Delta E_a(t)$ has been shown as being offset from $\Delta E_b(t)$ by 2 in FIGS. 7A, 8A and 9A for illustrative purposes. FIGS. 7B, 8B and 9B show plots of $\Delta E_a(t)-\Delta E_b(t)$ corresponding to FIGS. 7A, 8A and 9A, respectively. It is noted that in FIG. 7B because of the lack of dispersion $\Delta E_a(t)=\Delta E_b(t)$, and therefore the pilot tone modulation could potentially be adequately compensated. However, as shown in FIGS. 8B and 9B the addition of dispersion causes an inequality between $\Delta E_a(t)$ and $\Delta E_b(t)$ which worsens as the amount of dispersion is increased.

As a result, it may not be possible to adequately compensate for the impact of pilot tone modulation on a received optical signal if dispersion in the optical signal is not compensated.

Aspects of this disclosure provide mechanisms for compensating for the pilot tone induced OSNR penalty in an optical receiver that overcome or at least mitigate some or all of the drawbacks or limitations of known pilot tone removal mechanisms such as those described above. In particular, the present disclosure provides methods and apparatuses for pilot tone modulation compensation in an optical receiver signal processing chain before a symbol decision block after dispersion has been compensated/removed.

In summary, the present disclosure provides a method and apparatus for pilot tone compensation. The method and apparatus are applied to optical receivers that receive and decode high speed optical signals modulated with pilot tones. When operating in an environment where an input waveform has a pilot tone associated thereto, the method and apparatus of the present disclosure allow for the compensation of at least a portion of the pilot tone modulation present in the input waveform in order to reduce the pilot tone induced OSNR penalty.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole. It is therefore to be understood that within the scope of the appended claims, the application may be practised otherwise than as specifically described herein.

I claim:

1. A method for receiving an optical signal that includes a pilot tone, the method comprising:
   processing an initial waveform to generate a compensated waveform, the processing comprising dispersion compensation;
   calculating an intensity waveform in accordance with the compensated waveform;
   processing the intensity waveform to obtain a pilot tone frequency of the pilot tone, a modulation depth of the pilot tone, and a phase of the pilot tone;
   multiplying the compensated waveform with a pilot tone compensation factor to generate a modified compensated waveform, the pilot tone compensation factor being a function of the pilot tone frequency, the modulation depth, and the phase of the pilot tone such that substantially half of the pilot tone in the compensated waveform is cancelled in the modified compensated waveform; and
   determining a symbol carried by the modified compensated waveform.

2. The method of claim 1 wherein the pilot tone compensation factor is equal to:

$$1 - \frac{1}{2}m_d \times \sin(1 + 2\pi f_{PT}t + \emptyset),$$

where $m_d$ is the modulation depth of the pilot tone, $f_{PT}$ is the pilot tone frequency of the pilot tone, $\emptyset$ is the phase of the pilot tone, and t is time.

3. The method of claim 1 wherein calculating the intensity waveform and processing the intensity waveform to obtain the pilot tone frequency of the pilot tone, the modulation depth of the pilot tone, and the phase of the pilot tone are performed on a periodic basis to periodically update the pilot tone compensation factor.

4. The method of claim 1, wherein:
processing the initial waveform to generate the compensated waveform comprises processing four initial waveforms to generate four compensated waveforms, each initial waveform representing one of an in-phase horizontal polarization component of an electric field of the optical signal, a quadrature-phase horizontal polarization component of the electric field, an in-phase vertical polarization component of the polarization component of the electric field, and a quadrature-phase vertical polarization component of the electric field; and
each individual compensated waveform is a function of a respective one of the four initial waveforms.

5. The method of claim 4 wherein calculating an intensity waveform in accordance with the compensated waveform comprises calculating the intensity waveform in accordance with all four compensated waveforms.

6. The method of claim 5 wherein the intensity waveform is equal to the sum of the squares of each of the compensated waveforms.

7. The method of claim 1 wherein processing the intensity waveform includes performing a Fourier transform of the intensity waveform.

8. A method for receiving an optical signal that includes a pilot tone, the method comprising:
processing an initial waveform to generate a compensated waveform, the processing comprising dispersion compensation;
calculating an intensity waveform in accordance with the compensated waveform;
processing the intensity waveform to obtain a pilot tone frequency of the pilot tone, a modulation depth of the pilot tone, and a phase of the pilot tone;
multiplying the compensated waveform with a pilot tone compensation factor to generate a modified compensated waveform, the pilot tone compensation factor being a function of the pilot tone frequency, the modulation depth, and the phase of the pilot tone; and
determining a symbol carried by the modified compensated waveform;
wherein calculating the intensity waveform and processing the intensity waveform to obtain the pilot tone frequency of the pilot tone, the modulation depth of the pilot tone, and the phase of the pilot tone occurs during a first time interval of a first length; and
wherein multiplying the compensated waveform with the pilot tone compensation factor to obtain the modified compensated waveform comprises:
monitoring for detection of the pilot tone within a plurality of second time intervals of a second length, the second length being shorter than the first length; and
selectively multiplying the compensated waveform with the pilot tone compensation factor in a given second time interval of the plurality of second time intervals, responsive to detecting the pilot tone within a preceding second time interval of the plurality of second time intervals, wherein the preceding second time interval immediately precedes the given second time interval.

9. The method of claim 8 wherein the pilot tone compensation factor is equal to: $1-m_d\times\sin(1+2\pi f_{PT}t+\emptyset)$, where $m_d$ is the modulation depth of the pilot tone, $f_{PT}$ is the pilot tone frequency of the pilot tone, $\emptyset$ is the phase of the pilot tone, and t is time.

10. The method of claim 8, wherein the second length is shorter than a forward error correction (FEC) block duration.

11. The method of claim 10, wherein the second length is less than 20% of the FEC block duration.

12. The method of claim 8 wherein selectively multiplying the compensated waveform with the pilot tone compensation factor in the given second time interval responsive to detecting the pilot tone within the preceding second time interval comprises:
responsive to detecting the pilot tone within one of the second time intervals, multiplying the compensated waveform with the pilot tone compensation factor in a subsequent second time interval; and
responsive to not detecting the pilot tone within one of the second time intervals, not multiplying the compensated waveform with the pilot tone compensation factor in a subsequent second time interval.

13. An apparatus for receiving an optical signal that includes a pilot tone, the apparatus comprising:
a dispersion compensation unit configured to process an initial waveform to generate a compensated waveform, the processing comprising dispersion compensation;
a pilot tone compensation unit, operatively coupled to the dispersion compensation unit, configured to:
receive the compensated waveform;
calculate an intensity waveform in accordance with the compensated waveform;
process the intensity waveform to obtain a pilot tone frequency of the pilot tone, a modulation depth of the pilot tone, and a phase of the pilot tone;
calculate a pilot tone compensation factor as a function of the pilot tone frequency, the modulation depth, and the phase such that substantially half of the pilot tone in the compensated waveform is cancelled in the modified compensated waveform; and
multiply the compensated waveform with the pilot tone compensation factor to generate a modified compensated waveform; and
a symbol decision unit, operatively coupled to the pilot tone compensation unit, configured to receive the modified compensated waveform and determine a symbol carried by the modified compensated waveform.

14. The apparatus of claim 13 wherein the pilot tone compensation factor is equal to:

$$1 - \frac{1}{2}m_d \times \sin(1 + 2\pi f_{PT}t + \emptyset),$$

where $m_d$ is the modulation depth of the pilot tone, $f_{PT}$ is the pilot tone frequency of the pilot tone, Ø is the phase of the pilot tone, and t is time.

15. The apparatus of claim 13 wherein the pilot tone compensation unit periodically updates the pilot tone compensation factor by periodically calculating the intensity waveform, processing the intensity waveform to obtain the pilot tone frequency of the pilot tone, the modulation depth of the pilot tone, and the phase of the pilot tone, and calculating the pilot tone compensation factor as a function of the pilot tone frequency, the modulation depth, and the phase.

16. The apparatus of claim 13 wherein the pilot tone compensation unit is configured to:
process four initial waveforms to generate four compensated waveforms, each initial waveform representing one of an in-phase horizontal polarization component of an electric field of the optical signal, a quadrature-phase horizontal polarization component of the electric field, an in-phase vertical polarization component of the polarization component of the electric field, and a quadrature-phase vertical polarization component of the electric field,
wherein each individual compensated waveform is a function of a respective one of the four initial waveforms.

17. The apparatus of claim 16 wherein the pilot tone compensation unit is configured to calculate the intensity waveform in accordance with all four compensated waveforms.

18. The apparatus of claim 17 wherein the intensity waveform is equal to the sum of the squares of each of the compensated waveforms.

19. The apparatus of claim 13 wherein the pilot tone compensation unit is configured to process the intensity waveform by performing a Fourier transform of the intensity waveform.

20. An apparatus for receiving an optical signal that includes a pilot tone, the apparatus comprising:
a dispersion compensation unit configured to process an initial waveform to generate a compensated waveform, the processing comprising dispersion compensation;
a pilot tone compensation unit, operatively coupled to the dispersion compensation unit, configured to:
receive the compensated waveform;
calculate an intensity waveform in accordance with the compensated waveform;
process the intensity waveform to obtain a pilot tone frequency of the pilot tone, a modulation depth of the pilot tone, and a phase of the pilot tone;
calculate a pilot tone compensation factor as a function of the pilot tone frequency, the modulation depth, and the phase; and
multiply the compensated waveform with the pilot tone compensation factor to generate a modified compensated waveform; and
a symbol decision unit, operatively coupled to the pilot tone compensation unit, configured to receive the modified compensated waveform and determine a symbol carried by the modified compensated waveform;
wherein the pilot tone compensation unit:
calculates the intensity waveform and processes the intensity waveform to obtain the pilot tone frequency of the pilot tone, the modulation depth of the pilot tone, and the phase of the pilot tone during a first time interval of a first length;
monitors for detection of the pilot tone within a plurality of second time intervals of a second length, the second length being shorter than the first length; and
selectively multiplies the compensated waveforms with the pilot tone compensation factor in a given second time interval of the plurality of second time intervals, responsive to detecting the pilot tone within a preceding second time interval of the plurality of second time intervals, wherein the preceding second time interval immediately precedes the given second time interval.

21. The apparatus of claim 20 wherein the pilot tone compensation factor is equal to: $1-m_d \times \sin(1+2\pi f_{PT} t + \text{Ø})$, where $m_d$ is the modulation depth of the pilot tone, $f_{PT}$ is the pilot tone frequency of the pilot tone, Ø is the phase of the pilot tone, and t is time.

22. The apparatus of claim 20, wherein the second length is shorter than a forward error correction (FEC) block duration.

23. The apparatus of claim 22, wherein the second length is less than 20% of the FEC block duration.

24. The apparatus of claim 20 wherein the pilot tone compensation unit selectively multiplies the compensated waveforms with the pilot tone compensation factor by:
responsive to detecting the pilot tone within one of the second time intervals, multiplying the compensated waveform with the pilot tone compensation factor in a subsequent second time interval; and
responsive to not detecting the pilot tone within one of the second time intervals, not multiplying the compensated waveform with the pilot tone compensation factor in a subsequent second time interval.

* * * * *